United States Patent
Hätönen et al.

(10) Patent No.: US 7,519,860 B2
(45) Date of Patent: Apr. 14, 2009

(54) SYSTEM, DEVICE AND METHOD FOR AUTOMATIC ANOMALY DETECTION

(75) Inventors: Kimmo Hätönen, Helsinki (FI); Albert Höglund, Helsinki (FI); Markus Miettinen, Helsinki (FI); Jyrki Berg, Tampere (FI); Kari Kulmala, Tampere (FI); Sampo Torikka, Tampere (FI)

(73) Assignee: Nokia Corporation, Espoo (FI)

( * ) Notice: Subject to any disclaimer, the term of this patent is extended or adjusted under 35 U.S.C. 154(b) by 870 days.

(21) Appl. No.: 10/363,745

(22) PCT Filed: Jun. 6, 2001

(86) PCT No.: PCT/EP01/06405

§ 371 (c)(1),
(2), (4) Date: Sep. 26, 2003

(87) PCT Pub. No.: WO02/21774

PCT Pub. Date: Mar. 14, 2002

(65) Prior Publication Data

US 2004/0039968 A1 Feb. 26, 2004

(30) Foreign Application Priority Data

Sep. 11, 2000 (FI) ................................. 20001997

(51) Int. Cl.
 *G06F 11/00* (2006.01)
(52) U.S. Cl. ............................. 714/26; 714/4; 714/47; 716/12; 726/23
(58) Field of Classification Search ........... 714/26; 726/23
See application file for complete search history.

(56) References Cited

U.S. PATENT DOCUMENTS

| 5,317,725 A | | 5/1994 | Smith et al. |
| 5,365,514 A | * | 11/1994 | Hershey et al. ............. 370/241 |
| 5,987,442 A | | 11/1999 | Lewis et al. |
| 6,006,016 A | * | 12/1999 | Faigon et al. ................. 714/48 |

(Continued)

FOREIGN PATENT DOCUMENTS

EP 0661847 A2 7/1995

(Continued)

OTHER PUBLICATIONS

Hoglund, A.J. "A computer Host-Based User Anomaly Detection System", Jul. 2000, pp. 411-416.*

(Continued)

*Primary Examiner*—Emerson C Puente
(74) *Attorney, Agent, or Firm*—Squire, Sanders & Dempsey L.L.P.

(57) ABSTRACT

A method and system for monitoring the behavior of at least one observable object, e.g. a network element, of a network, wherein at least one parameter of the observable object is repeatedly detected. An actually detected parameter is input to a learning process and to an analyzing process, wherein the learning process forms a reference, based on at least two detected parameter values, for describing the behavior of the observable object. The analyzing process compares the input parameter and the reference for detecting an anomal behavior. The parameter preferably is a vector which includes several values describing properties or functioning of the observable object, and is formed based on events and/or reports from the object.

21 Claims, 5 Drawing Sheets

U.S. PATENT DOCUMENTS

| | | | |
|---|---|---|---|
| 6,105,149 A * | 8/2000 | Bonissone et al. | 714/26 |
| 6,442,542 B1 * | 8/2002 | Ramani et al. | 707/3 |
| 6,609,036 B1 * | 8/2003 | Bickford | 700/30 |
| 6,609,217 B1 * | 8/2003 | Bonissone et al. | 714/26 |
| 2003/0225520 A1 | 12/2003 | Hoglund et al. | |
| 2004/0039968 A1 | 2/2004 | Hatonen et al. | |

FOREIGN PATENT DOCUMENTS

| | | | |
|---|---|---|---|
| EP | 0849910 A2 | 6/1998 | |

OTHER PUBLICATIONS

Albert Höglund, "An Anomaly Detection System for Computer Networks" Helsinki University of Technology, appearing in Abstract of Master's Thesis, 72 Pgs.

"A Computer Host-Based User Anomaly Detection System Self-Organizing Map" by Hoglund, et al Neural Networks, 2000. IEEE. pp. 411-416 vol.

* cited by examiner

SYSTEM, DEVICE AND METHOD FOR AUTOMATIC ANOMALY DETECTION

FIELD AND BACKGROUND OF THE INVENTION

The invention relates to a system, device and method for automatic anomaly detection, in particular to the automatic detection of quality indicators updated in real-time.

Some networks may provide a network infrastructure for operators for offering services to the subscribers. Because network infrastructure is very complex and may be affected by the environment, problems may arise which decrease the quality of service experienced by the subscribers. If such problems are detected and solved quickly and efficiently, the quality of service may be kept at a very high level.

The expectations of customers regarding access to services over the Internet are becoming more demanding, and response times for access to critical data are getting more important. As a result, efficient real-time support over networks will be critical for the continued growth of the Internet and intranets. This support for real-time services requires "Quality of Service" management procedures in mobile networks so that the scarce spectrum can be used as efficiently as possible.

The significant growth of networks including an increased number of different elements requires sophisticated methods and tools that enable centralized network and service monitoring in large networks so as to provide effective network operation.

Mechanisms for detecting abnormal situations belong to one of two major categories, namely rule-based detection mechanisms and anomaly detection mechanisms (sometimes called also novelty detection mechanisms). Rule-based detection mechanisms attempt to recognize certain behavior patterns which are known to be improper like exceedings of given thresholds. Thus, rule-based detection mechanisms have two severe limitations: they can only detect problems which have occurred before and which have been explicitly taught to the detection system or programmed into it. Anomaly detection systems (ADS), as used in this application, reverse the detection problem: they are taught what normal behavior is, and anything deviating significantly (by a predetermined margin) from the norm is considered anomalous. ADS mechanisms are capable of detecting potentially problematic situations without explicit training of such situations. An example of an ADS is disclosed in the article: Hoglund, Albert: *An Anomaly Detection System for Computer Networks*, Master of Science thesis, Helsinki University of Technology 1997. Thus an ADS is defined as a mechanism which is trained with normal behavior of the target system. Accordingly, an ADS flags every significant deviation from normal as a potential anomaly. In contrast, a rule-based detection system is trained with known modes of abnormal behavior and it can only detect the problems that have been taught to it.

Generally it is difficult to have alarms indicating quality of service problems. It is also very challenging to define proper thresholds which generate appropriate numbers of alarms. If the alarm thresholds are too high, there are no notifications about problems. If the alarm thresholds are too low, there are too many alarms to be handled efficiently. If the alarm thresholds are updated manually, the updating is very cumbersome and must be performed whenever the network conditions change. Further, alarm thresholds are normally different in different parts of the network which leads to additional problems.

Usually the operators are not able to freely define Key Performance Indicators (KPIs) which are monitored. The KPIs are defined by network manufacturer and the operator can only select whether or not to use a KPI. In systems which monitor predefined KPIs of a network element, the operator may be able to define alarm thresholds for the KPIs manually. In such cases, it is only possible to monitor the most important issues on a general level. Furthermore, the adjusting of alarm thresholds is very difficult.

With an ever-increasing alarm flow it is vital that the network operator has means to cut down the number of less important alarms and warnings. In this way the operating personnel can concentrate on service-critical alarms that need to be dealt with immediately.

When simply relying on the counting the number of error-indicating events, and issuing an alarm when the number of events exceeds some user determined value, there may be some situations where this solution does not function properly. For example, in front of Helsinki there are some islands with a single base station on them. Boats with several hundreds of passengers will bypass the islands every now and then, and naturally the base station on those islands may be very highly loaded by the mobile subscribers on the boat. When the breaking of calls is counted for causing alarms, such alarms will be false, because the calls are broken by natural phenomena, i.e. the bypassing ship that is moving out of the coverage area of the mobile network, and not by any network malfunction. However, in some other base station a similar course of events might indicate some severe network problem.

The article: Hoglund, Albert: *An Anomaly Detection System for Computer Networks*, Master of Science thesis, Helsinki University of Technology 1997, discloses an ADS for a Unixbased computer system. The disclosure contents of this article are in toto incorporated herein by reference. The disclosed system consists of a data-gathering component, a user-behavior visualization component, an automatic anomaly detection component and a user interface. The system reduces the amount of data necessary for anomaly detection by selecting a set of features which characterize user behavior in the system. The automatic anomaly detection component approximates users' daily profiles with self-organizing maps (SOM), originally created by Teuvo Kohonen. A crucial parameter of a SOM is a Best Mapping Unit (BMU) distance. The BMUs of the SOMs are used to detect deviations from the daily profiles. A measure of such deviations is expressed as an anomaly P-value. According to reference 1, the ADS has been tested and found capable of detecting a wide range of anomalous behavior.

U.S. Pat. No. 5,365,514 discloses an event-driven interface for a system for monitoring and controlling a data communications network. The device is listening to serial data flow in a LAN (Local Area Network), and provides a control vector. The device is not structured to receive and analyse packets of a packet flow.

SUMMARY OF THE INVENTION

The invention provides a system and method for automatic anomaly detection, in particular for the automatic detection of anomalies in quality indicators updated in real-time.

The present invention provides a system, method and/or device as defined in any of the independent claims or any of the dependent claims.

According to one aspect of the invention, a method and system are provided for monitoring the behavior of at least one observable object of a network, wherein at least one parameter of the observable object is repeatedly detected, at least one parameter is checked with regard to fulfilling predetermined criteria, a vector is formed based on the monitored parameter depending on the result of the checking step, and the formed vector is evaluated for monitoring the behavior of the observable object.

The observable object can be any monitored entity in the network, e.g. a network element, a subscriber, subscriber group, geographical area, circuit group, service, or alike, that can be identified and referred to in predetermined criteria that are used in the forming of the vector. The vector comprises several values which describe properties or functioning of the observable object. The predetermined criteria and the observation period, during which one vector is formed, are user definable.

The formed vector is preferably input to a learning process and to analyzing process, the learning process is forming a reference, based on the input vector and a previous value of the reference or at least one previous input vector, for describing the behavior of the observable object, and the analyzing process is comparing the input vector and the reference for detecting anomalous behavior.

The vector is preferably formed based on detected values in RTT (Real Time Traffic) reports. An RTT report contains fields defining parameters of phenomenons or events in the network e.g. for calls it can include the reason code for call break, a length of call, and/or a number of handovers during call to name a few.

The reference formed by the learning process may be a profile vector generated from at least two vectors. In another case, e.g. in a SOM (Self-Organizing Map) case, the profile is not a vector but is made up e.g. of the trained SOM itself and the Best Mapping Unit Distance Distribution (BMUDD).

Key Performance Indicators (KPIs) which are computed and monitored measure the quality of service seen by the subscribers. The number of parameters that fulfill the predetermined criteria during an observation period, can be used for forming these KPI values which form part of the vector, each parameter having its own criteria. E.g. when an RTT value fulfills the predetermined criteria, the value of one KPI is increased by one. The fulfilling of the predetermined criteria can be checked by comparing fields of an RTT report or values derived from them by given functions to predetermined field thresholds.

One condition can be e.g.

If (reason code=4 (or 5 or 6)) and (length of call>4 minutes) and (number of handovers=0) the corresponding KPI value would indicate, how many breaking calls that fulfill that condition, happened during the observation period. These KPI values are then put together to form a vector for the learning and analyzing processes.

In accordance with one aspect of the invention, the invention provides a system for collecting data from an observable object, e.g. a network element, in real-time and for automatically detecting, from this data, anomalies in the quality of service in comparison to the normal behavior of the observable object. Anomalies are detected based on user-definable key performance indicators (KPIs) of the observable object. KPIs measure the quality of service seen by the subscribers. Detected anomalies indicate potential problems in the quality of service.

The system can be connected to any network element which sends a report to the system in real-time about an event, such as a call attempt or a short message, which occurred in the observable object or due to some action of an observable object. Reports are defined in configuration files enabling the adaptation of the system to any observable object. Various data are included in the reports. The reports preferably contain fields about subscriber information, event details, used network resources, used additional services and quality indicators. These fields can be used to define KPIs by the user.

The system learns the normal values of the KPI vectors and is thus capable of detecting and indicating an abnormal behavior of the observable object when the actual KPI vectors deviate significantly from the learned KPI vectors.

These indications can be interpreted as alarms about potential problems. In a preferred implementation, the system not only learns the normal values of the KPIs, but also, in what combinations they occur. A set of perfectly normal KPI values can then represent an anomaly, if the values occur in an unusual combination.

Advantages of the invention include the following: provision of a flexible solution for any observable object. Further, the solution is observable object independent. The KPIs can be defined by the users. User definable KPIs are easy to introduce and monitor. The KPIs are preferably updated in real-time. In practise, KPI updating intervals, i.e. monitoring intervals of more than e.g. 5 or 10 seconds, preferably at least 30 seconds or more are sufficient. The amount of work is reduced because there is no need to define and iterate alarm thresholds, and no need for maintenance after the KPIs are defined. The provided system and method automatically adapt to different situations as normal situations in case of slowly changing normal situations.

The invention provides means and functions for monitoring applications. Real-time network surveillance and cost-efficient operations are possible at both the regional and global level. Alarm filtering applications help to reduce operator workload by adjusting the network information flow to an optimal level. The invention may provide alarm manuals and alarm history information to assist in troubleshooting network problems.

The invention allows efficient problem detection and working procedures. By means of centralised monitoring tasks, automation and integration of other management systems is possible. The workload and costs of managing the network are reduced as a result of improved network quality through rapid problem detection and correction. Fewer site visits are necessary due to centralised operations.

The invention provides adjustable alarm sensitivity. Features of a preferred embodiment include: receiving traffic reports from observable objects, e.g. network elements; using reports in counting key performance indicators (KPI); forming vectors of KPIs; and using the vectors as input data to an algorithm that learns the normal functioning of the observable objects and detects anomalies.

DETAILED DESCRIPTION OF PREFERRED EMBODIMENTS OF THE INVENTION

Figure 1:
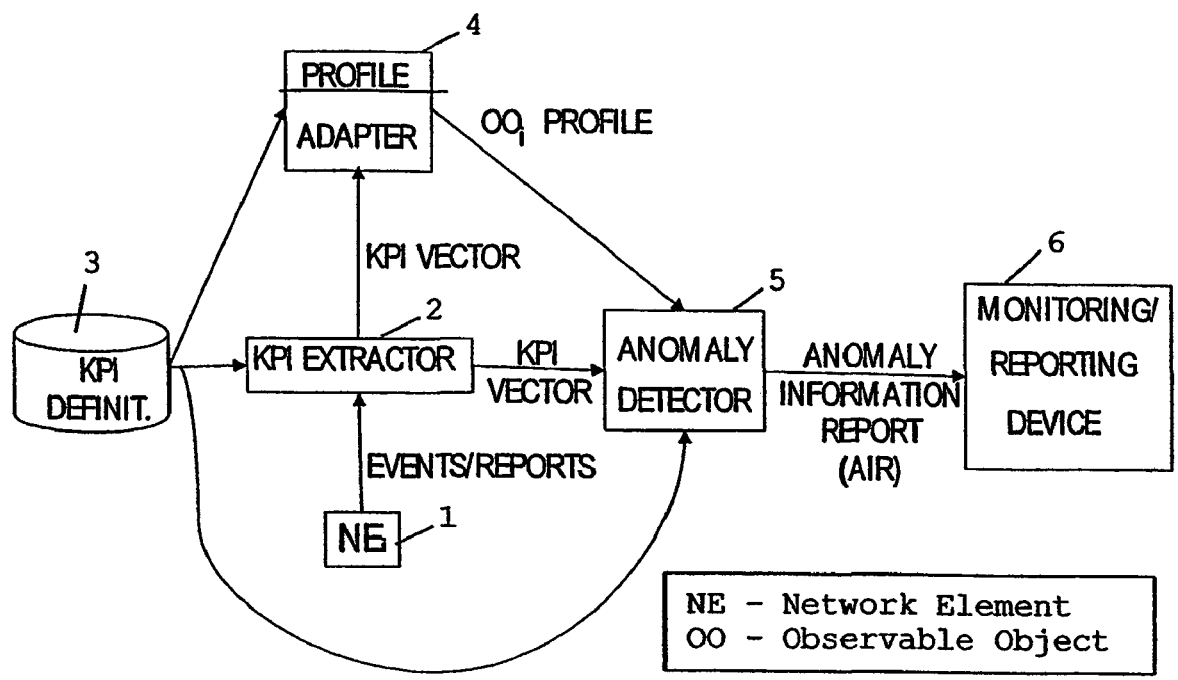
FIG. 1 illustrates a basic structure of a communication system in accordance with an embodiment of the invention.

Basically, the invention provides a configurable system and method for collecting data from various observable objects, e.g. network elements, part of them, users, user groups or services etc., and detecting anomalies in the QoS automatically, by comparing the data to data that has been collected when the network is working normally. Anomalies are detected based on user definable "key performance indicators" (KPI) of the observable object. The system learns the normal values of the KPI vectors and is thus capable of indicating the abnormal behavior of the network. The system alarms for anomalies when the deviation is strong enough compared to normal behavior. A benefit is that the user does not need to enter absolute threshold values.

According to a preferred embodiment, the invention provides, or is used in, a system that monitors the functioning of a communication network, e.g. a mobile network, and detects anomalies. The idea is that the system learns the normal functioning of the network, and is thus able to detect what is not normal.

In one of the preferred implementations of the invention, the system or process may include the following steps:

Receiving of RTT reports (RTT=Real Time Traffic report, preferably delivered as a UDP message) from at least one network element. An RTT report indicates some events associated with the observable objects, and it consists of several fields, describing different attributes of the event (eg. event code, reason code, time information, subscriber identification). There can be an unlimited number of fields in the RTT report, e.g. a report from a Mobile Switching Center (MSC) has about 100 fields;

RTT reports will be used in counting KPI (Key Performance Indicator) values. The KPI value, or one of the KPI values, may be the number of RTT reports in a given Time period, that fulfill some predetermined condition, e.g. conditions for field values.

In one KPI value, there may be several field value conditions with some logical function (ANDed or ORed). e.g.

KPI(1)=number of (RTT(field1)=value1 and value2<RTT(field2)<value3), or,

KPI(2)=number of (RTT(field1)>value1).

Forming of vectors, by using the KPI values as vector components. The vector describes the functioning of the observable object.

Using the vectors as input data to an algorithm. In this invention, the algoritm preferably is a neuron (neural) network algorithm such as SOM (self organising map) or a clustering algorithm such as the K-means algorithm or some other corresponding neural or statistical algorithm.

The algorithm will learn the normal functioning of the network, and the algorithm will form a profile describing the normal functioning of the network. In a preferred embodiment the profile consists of nodes or cluster centroids.

Finding best mapping nodes or cluster centroids for incoming vectors;

Counting distance between new incoming vectors and the best mapping node or cluster centroid.

Counting a distribution for distances;

Finding out whether there is a probability for an incoming distance less than predetermined value;

Alarming, if answer is yes.

According to one aspect of one of the preferred embodiments of the invention, it includes the steps of forming vectors of counted KPI values, and inputting those vectors to a neural algorithm or the like.

An RTT-report ('Real Time Traffic' report) is a structured report of an event in the network. RTT reports are binary data records consisting of fixed-width fields in a predefined order. The structure of the report is definable e.g. by a user. The report contains fields like subscriber number, reporting time, time of A-call, time of B-answer, call ending type (DX Cause), etc. A network element (NE) sends an RTT-report to a system after a certain event. In a system, e.g. a Traffica system, KPIs are updated based on the values of different fields in the RTT report. Note that the system can combine data from different NEs which means that one can have network-wide or system-wide KPIs.

In GSM networks, an RTT report can be generated after each call, short message, handover, location update etc. RTT reports for calls contains fields such as:

start time of the call,
end time of the call,
identification of A and B subscriber (MSISDN, IMSI),
location information of A and B subscriber (cell, lac),
used network resources (BSC, circuit group),
used mobile equipment (IMEI),
used services,
clear code (DX cause)—the reason code for call ending,
etc.

In the following, an example of an RTT report definition is listed.

Name of a field, offset, data type+length
Sub_Id 0 UINT16
Report_Date 2 BCDDATE
Report_Time 6 BCDTIME
A_Caller_Id 10 UINT32
B_Caller_Id 14 UINT32
B_Answered_Date 18 BCDDATE
B_Answered_Time 22 BCDTIME
Dx_Cause 26 UINT16 and so on.

In GPRS networks, an RTT report can be generated after each attach/detach, PDP context activation/deactivation etc. On the system side, e.g. Traffica side, the structure of RTT report is preferably defined in ASCII files, meaning that defining new RTT report types is very simple and flexible.

The RTT-reports can also be replaced by any (semi) structured messages, e.g. alarms, that are describing network operations or events and that can be handled by a feature extractor. Furthermore they can be sent not only after certain events, but also after certain fixed time period or after a fixed number of certain events.

KPI (Key Performance Indicator) values are functions of one or more RTT reports' field values and/or other KPIs. In the simplest case they are counters. For counting the KPI values using the RTT reports, a KPI value may be simply increased by one, if a user definable condition is true for the analysed RTT report. The user definable condition is a comparison between some fields of RTT report data with predetermined values.

The KPI value can also be, in some of the embodiments, a function of at least one field values and/or other KPIs. For example, if the field value already counts something like the usage of a resource X like e.g. the amount of used time slots or seconds of used processor time, the KPI value can be a cumulative sum of field value in given time period. Furthermore, the field does not necessarily have to be a discrete count of something, it can be any kind of quantity measure.

Vectors are formed by using the KPI values as vector components such that the vector describes the functioning of the observable object, e.g. the NE, a part of a NE or a subscriber group. It is e.g. possible to attach each calculated KPI value as one component to the vector. In case one or some KPI values cause bad behavior in the sum model, such KPI values can be dropped from the vector. In principle there are no restrictions. One can select those KPIs that best describe the phenomenons one wants to monitor.

Vectors are formed because the used algorithm uses vectors as input data. The algorithm may be e.g. a self organising map (SOM) algorithm. A SOM algorithm is used in other network optimizing tasks as well and is a neural network algorithm.

Instead of a SOM based anomaly detection method, other methods may be used as well. These include, for example, K-means clustering, which resembles closely the used method, or other neural or statistical methods, e.g. coming from statistics in field of multivariate analysis, etc., provided that the methods are able to find anomalies (some times called also novelties) or sudden changes in multivariate time series.

There are several applicable distance measures for counting the distance between new incoming vectors and the best mapping node depending on the embodiment. The distance measure can be e.g. Kulback—Leibler distance for histograms, or in some other embodiment the so called city block distance, or whatever norm is best suited for the embodiment.

The counting of a distribution for distances is preferably done in discrete steps. All the incoming distances are recorded in a table or such, and it is counted how many distances occur at each discrete area. E.g. how many distances have been recorded between the range a . . . b, b . . . c, c . . . d, d . . . e, and how many recorded distances there are in total. Then, the distribution can be calculated by dividing.

The distribution is a function that tells a probability for an incoming distance being less than a predetermined value directly. By giving an incoming distance as input to the distribution, the output is how probable it is that a distance of given length occurs.

FIG. 1 shows the system architecture of a structure representing an embodiment of the invention. The embodiment can be used in a communication system or network, e.g. of GPRS (General Packet Radio Service) or GSM structure such as a public land mobile network (PLMN). Mobile or fixed user terminals, e.g. GSM mobile station (MS) are able to receive services from, or communicate with other network elements.

FIG. 1 shows components of a first embodiment and their interaction. The components include one or more observable objects (OO), e.g. network elements (NE) 1. The NE 1 can be of any type that reports about its performance by some kind of reports. A device or function 3, e.g. a storage, includes KPI definitions, i.e. definitions of generated KPIs that are created based on the information sent by Network Element 1. The KPI definitions can be common to all network elements of the same type, or can be specific for each element. The KPI definitions may be changeable on the fly, e.g. immediately when an operator changes the definitions, and can be given either as rules or formulas or in any other format that can be executed by a computer.

A KPI extractor 2 parses incoming messages from the NE 1 and eventually further NEs, and creates KPI vectors that describe the behavior of NE 1 or each NE. The KPI extractor 2 works on-line in real time, and delivers KPI vectors to a profile adapter 4 and anomaly detector 5 when defined in KPI definitions of means 3.

The profile adapter 4 creates and updates the behavior descriptor, i.e. NE profile, for each monitored NE 1 or each NE type. The update can be done in real time either after each generation or receipt of a KPI vector, or periodically after a given time interval or after a given number of received KPI vectors. The form of generated profile depends on the used anomaly detection method.

The anomaly detector 5 compares the most recent KPI vector of KPI extractor 2 to the behavior profile, i.e. NE profile received from profile adapter 4, and detects differences of the KPI vector in comparison to the NE profile. The detector 5 gets the profile of each NE or NE type from the profile adapter 4 either by request or periodically or whenever the adapter 4 is ready to submit such a profile. This can be implemented with one of several well-known anomaly detection methods.

The Anomaly detector 5 sends a report, i.e. Anomaly Information report, to a monitoring/reporting device 6 whenever it detects an interesting deviation in network element(s) behavior in comparison to the profile of the NE 1. This monitoring/reporting device can be either a dedicated monitoring application in a computer or an SMS- or HTTP-based application in a mobile device.

The components 2 to 6 can be implemented as processes in one or several separate computing devices or as specific circuits that are integrated with the network monitoring devices.

Figure 2:
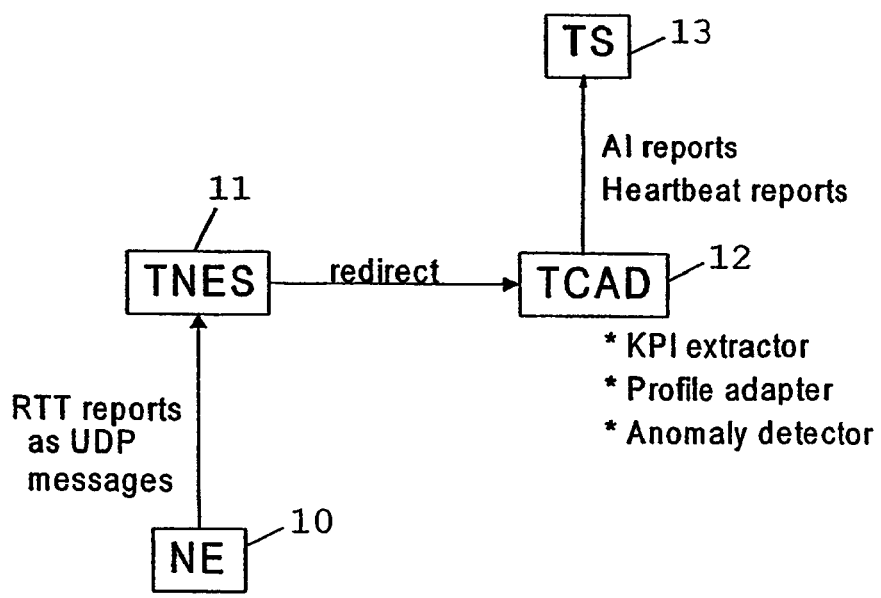
FIG. 2 shows the structure of another embodiment of the invention.

One example of the structure of an implementation architecture of the invention is shown in FIG. 2. As shown in FIG. 2, a network element (NE) 10 sends RTT reports, e.g. as UDP (User Datagram Protocol) messages, to a network element TNES 11 which redirects such report messages to a network element TCAD 12. The TCAD 12 includes the means or functions 2, 4, 5 of FIG. 1, i.e. provides a KPI Extractor, Profile Adapter, and Anomaly Detector function/means. The TCAD 12 provides anomaly information reports and heartbeat reports and sends these reports to a network element TS 13. The TS 13 registers such reports and issues alarms in case of need.

The embodiments shown in FIGS. 1, 2 provide a monitoring solution and contain means for collecting and storing real-time information from the network to detect faults in network elements and to monitor the quality of service provided by the network. This provides visibility to the network status in real-time at any time and anywhere.

Figure 3:
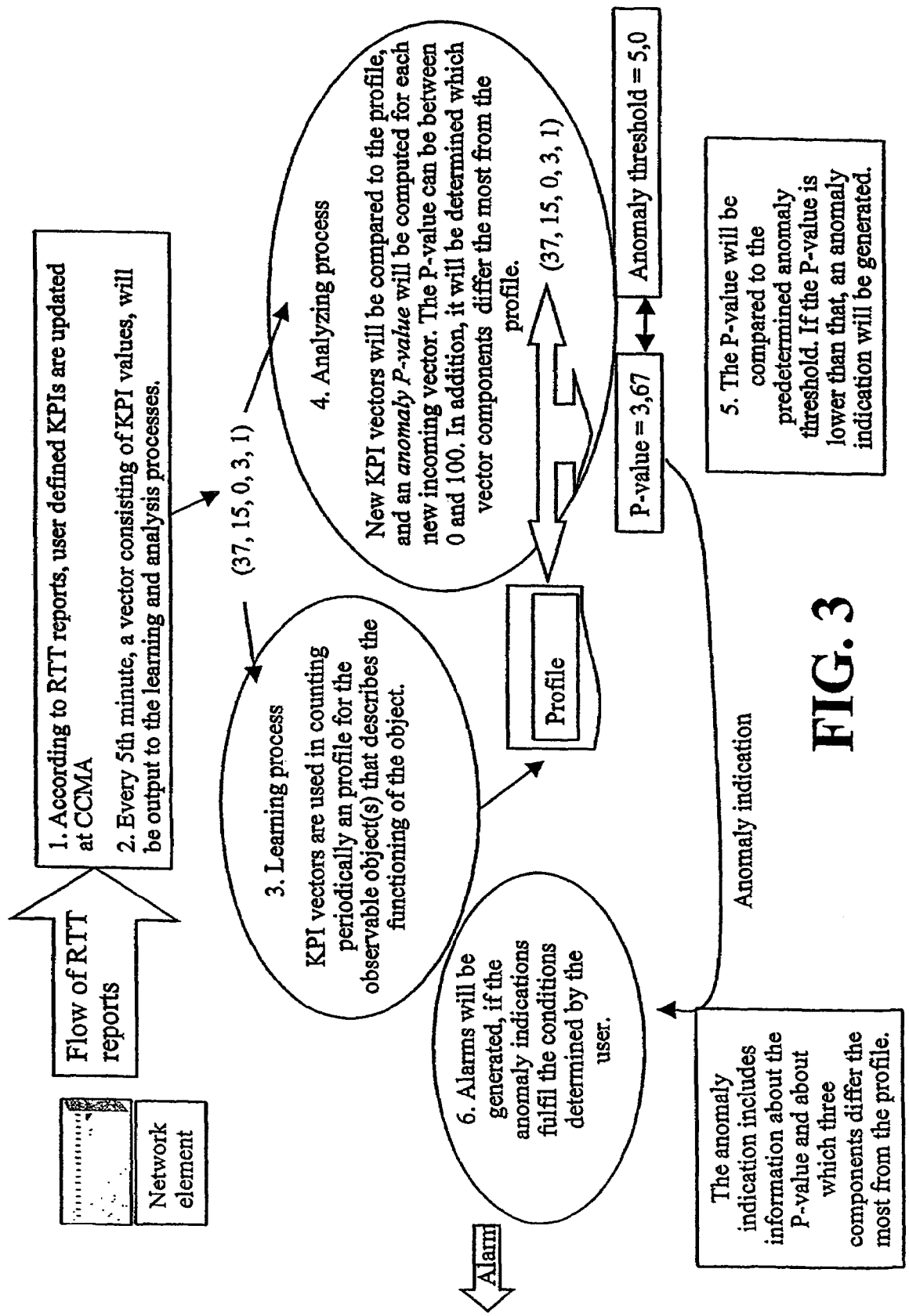
FIG. 3 shows the steps of another embodiment of the invention.

FIG. 3 illustrates method steps of an embodiment of the present invention. As shown by the arrow "Flow of RTT reports", the monitored network element sends RTT reports to a network component or another entity, e.g. CCMA. The CCMA (Clear Code Matrix) is a component of the Traffica product and it is responsible for calculating the KPI values from the RTT reports. It is a user-defined decision tree which consists of nodes and counters. Counters can be KPIs as such or KPIs can be calculated from two or more counters. There, in a step 1., user defined KPIs are updated e.g. at the counter tree, e.g. the CCMA according to the received RTT reports. With an appropriate timing, e.g. every 5th minute, a vector consisting of KPI values, will be output to the learning- and analyzing processes. As shown in FIG. 3, each output vector may be a sequence of KPI values, e.g. "(37, 15, 0, 3, 1)". This forming of a KPI vector for the or each monitored network element is depicted by step 2 of FIG. 3.

Each KPI vector is input to a learning process, step 3, as well as to an analyzing process, step 4. In the learning process, the received KPI vectors are used in counting periodically a profile for the monitored network element(s). The profile represents the functioning of the network element. When using the SOM algorithm, the profile is the trained SOM itself. The SOM consists then of k nodes (neurons). Each node is a vector of the same dimension as the KPI vectors. The number of nodes (k) ought to be dependent on the number of KPI vectors (n) in the training data. It could be e.g. desirable to have approximately n=20*k. When using SOM or K-means the profile consists of as many vectors as nodes or neurons and the distance distribution.

In the analyzing process, step 4., any new KPI vector received from step 2, will be compared to the profile formed in step 3 based on the previous KPI vectors, so as to detect any surprising deviations therebetween which might indicate an alarm situation. Preferably, an anomaly P-value will be calculated for each new incoming vector. The value of P value can range e.g. between 0 and 100. The closer to 0 the value is, the more the new vector differs from the profile. In addition, the process will count which vector components will differ from the profile the most.

In the example shown in FIG. 3, the calculated P-value is 3.67. An anomaly threshold is set for comparison to the P-value which threshold may have the value of 5.0. In step 5., the P-value will be compared to the predetermined anomaly threshold. If the P-value is lower than the threshold, an anomaly indication will be generated, as indicated by the arrow shown in FIG. 3.

In step 6., an alarm will be generated, if the anomaly indication fulfills the conditions determined by the user.

The anomaly indication sent as a result of a positive comparison of step 5., includes information about the actual P-value leading to the alarm, and about which e.g. three components of the actual KPI vector differed the most from the profile. The mentioned number of three is just an example, the number of components reported to be differing the most from the profile can range from zero up to the number of components in the KPI vectors.

The invention can be implemented to support also other technologies than GSM. The adaptive monitoring and reporting can be implemented e.g. in a GPRS NE, e.g. a support node such as SGSN (Traffic for GPRS) or in CPS & MSS (Traffic for 3G and All-IP) network elements (CPS=Call Processing Subsystem; MSS=Management Statistic Subsystem). The invention will support these adaptation layers as well.

The second embodiment of the invention described below and shown in FIGS. 4 to 7 relates to anomaly detection in a computer or in telecommunication networks in which the concept of normal behavior varies with time. The details of this embodiment as described below and shown in FIGS. 4 to 7 can be arbitrarily combined with the details of the above discussed embodiments. More particularly, this embodiment relates especially to teaching an anomaly detection mechanism. An example of such an anomaly detection mechanism is based on self-organizing maps (SOM).

A problem with known SOM-based ADS mechanisms is that they are restricted to detecting problems in systems having a well-defined normal behavior. In most telecommunication networks the concept of "normal behavior" is, at best, vague. A network element's behavior at peak time is very different from its behavior at the quiet hours just before dawn. More precisely, most often it is the users' who cause the variation in what is called normal. In other words, known ADS mechanisms do not readily lend themselves to detecting problems in systems or elements whose normal behavior varies with time.

Accordingly, this embodiment of the invention provides a mechanism for teaching ADS mechanisms which rely on the concept of normal behavior in a system in which the normal behavior varies significantly with time. In this context, "significantly" means that a behavior which is normal at certain times is to be considered anomalous at other times.

This aspect of the invention is partially based on the idea that time is used as a component of the input data to the ADS. But it is not sufficient to include time in the input data, if time is represented as a quantity which increases linearly from a fixed start point. This is because such a presentation of time is not repeating, and the ADS would not know when a certain behavior was normal and when anomalous. It is also not sufficient to introduce time as a periodic quantity (such as a 24-hour clock) because the daily jumps from 23:59 to 00:00 would introduce severe discontinuities to the input data.

Accordingly, the embodiment is also based on formulating a presentation of time which is suitable for solving the problem caused by the time-varying normal behavior of systems such as telecommunication networks. According to this aspect of the invention, the presentation of time which is used as a component of the input data is 1) periodic, 2) continuous and 3) unambiguous (within the period of the input data). A preferred example of such a presentation of time (t) is a projection to x and y components such that $x=\sin(2\pi t/L)$ and $y=\cos(2\pi t/L)$ where L is the length of the period of variation, typically 24 hours or a week. At first sight, such a two-dimensional presentation of time would seem to use both dimensions of a two-dimensional SOM map, but such SOM maps are for visualization purposes only, and inside a computer memory, an SOM map can have an arbitrary number of dimensions.

The continuity requirement for the presentation of time should be interpreted with the constraints of reality in mind, however. All digital systems have a finite resolution, which means that no presentation of time can be perfectly continuous. In addition, some memory can be saved when storing the observations by omitting some of the least significant bits of the observations, ie by quantization. For the purposes of the invention, a presentation of time is sufficiently continuous (="large-scale continuous") if it does not contain discontinuities which are large enough to affect a decision between normal and anomalous behavior. For example, in a telecommunication network with a usage period of 24 hours, discontinuities (quantizations) of up to about 10 or 15 minutes may be considered acceptable if there are no times at which user behavior changes so fast that a certain type of behavior is considered normal at a certain point of time but anomalous 10 or 15 minutes later. In contrast, the presentation of time for a system which opens and closes (or radically changes its behavior in other ways) at well-defined times must have considerably smaller discontinuities.

Some memory can be saved if it is known beforehand that changes in the behavior of the observable objects are small and/or gradual during certain parts of the period (such as nights) and more pronounced during other parts (such as days). In such a case, the presentation of time can be such that the resolution is variable within the period. This means that one bit may represent, say, 30 minutes during the quiet parts of the period and 5-15 during the more active parts of the period.

In some cases a single period (typically 24 hours) is sufficient, but sometimes two or three nested periods may be required. For example, the presentation of time may comprise one component with a 24-hour period and another with a one-week period. For locations or situations strongly affected by seasonal changes, a third component with a one-year period may be required.

This aspect of the invention is not limited to self-organizing maps but can be used with other clustering techniques such as k-means or other corresponding neural or statistical algorithm.

According to a preferred embodiment of the invention, all variables (components of the input data), including the presentation of time, are scaled such that the variance of each variable is the same, preferably one.

The invention can be implemented as software routines in a computer system having access to the objects to be observed.

Figure 4:
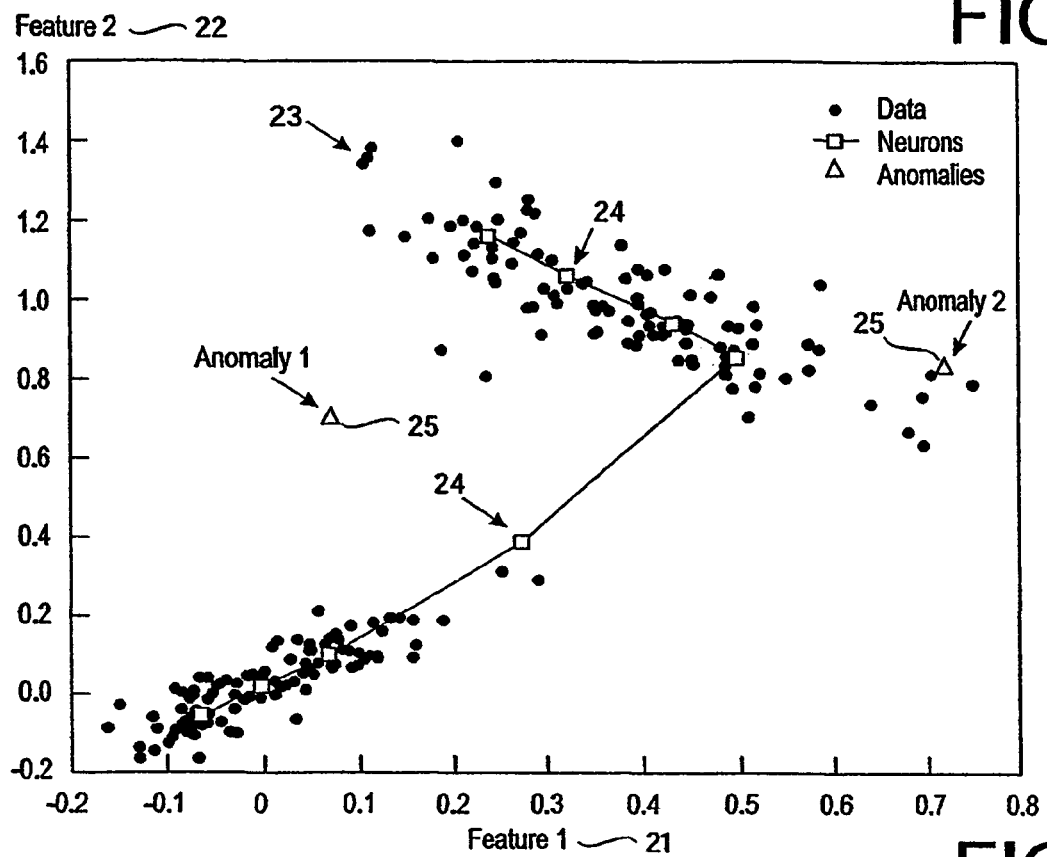
FIG. 4 shows a self-organizing map.
Figure 5:
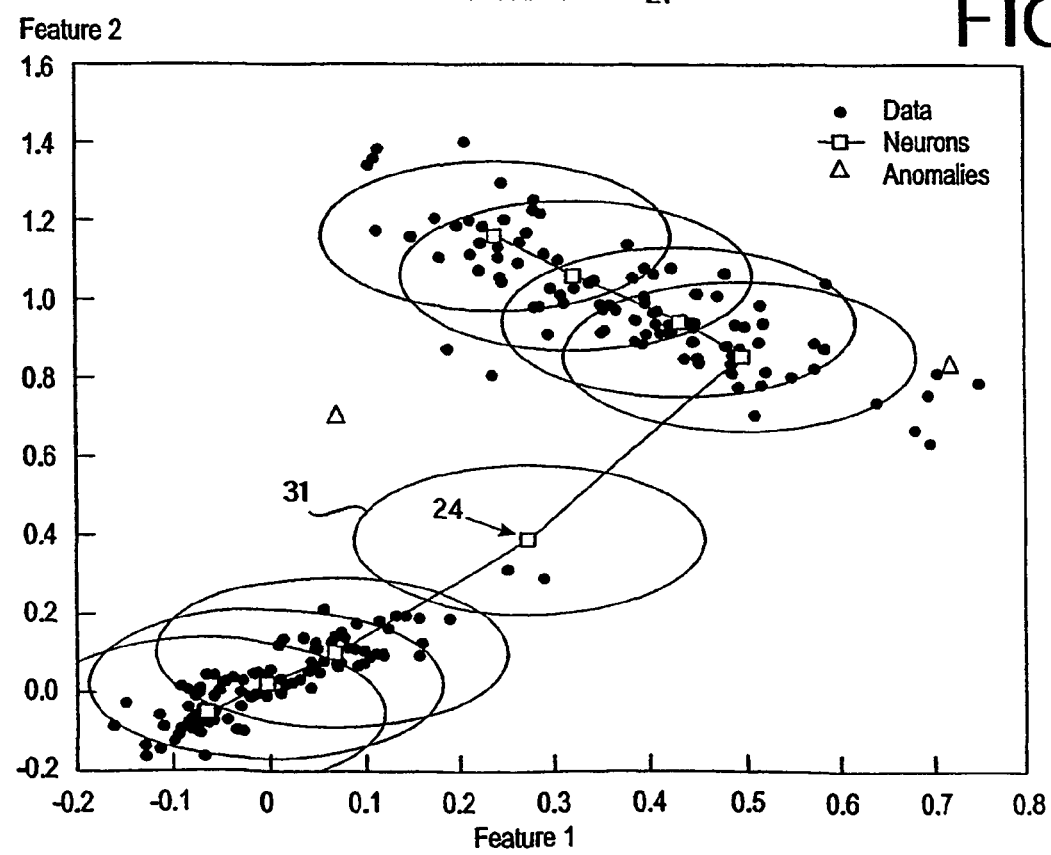
FIG. 5 is a variation of FIG. 4, with circles centred around the neurons of the SOM.
Figure 6:
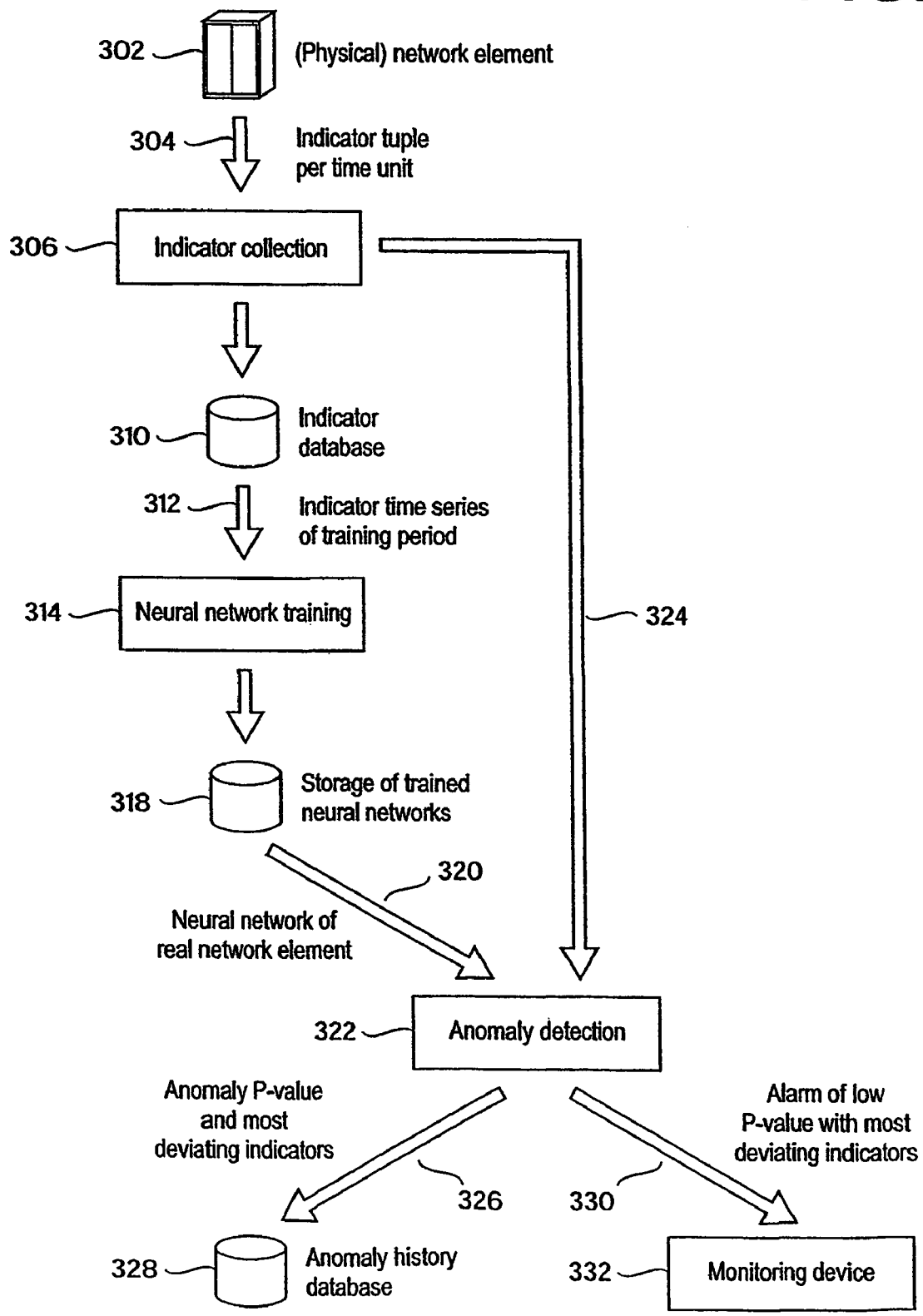
FIG. 6 is a process chart illustrating a preferred embodiment.

FIG. 4 shows a self-organizing map;

FIG. 5 is a variation of FIG. 4, with circles centred around the neurons of the SOM;

FIG. 6 is a process chart illustrating the second embodiment; and

Figure 7A:
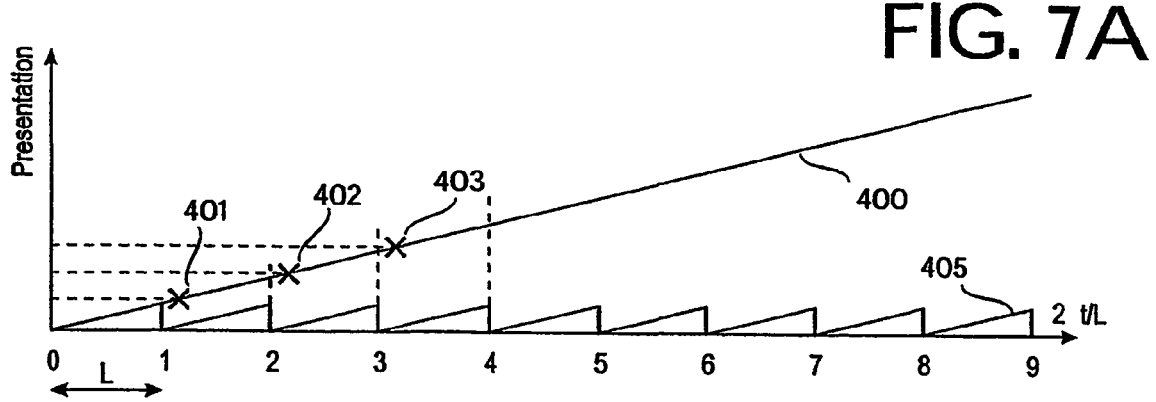
FIGS. 7A to 7C illustrate different presentations of time.
Figure 7B:
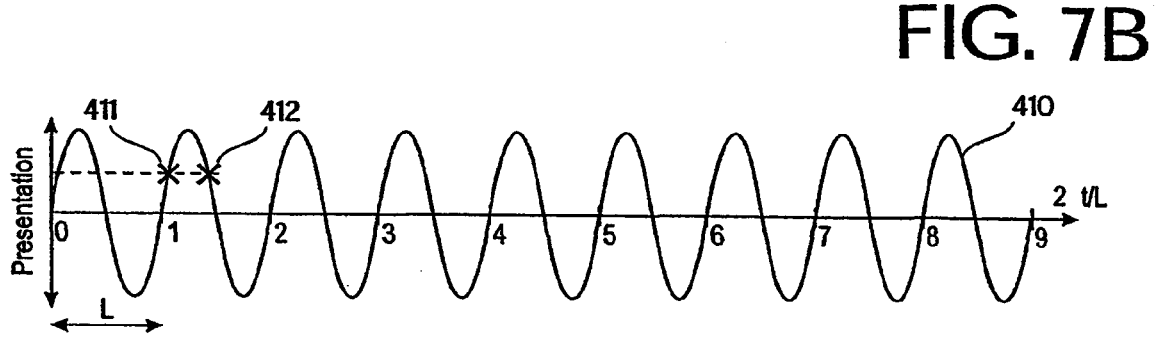
Figure 7C:
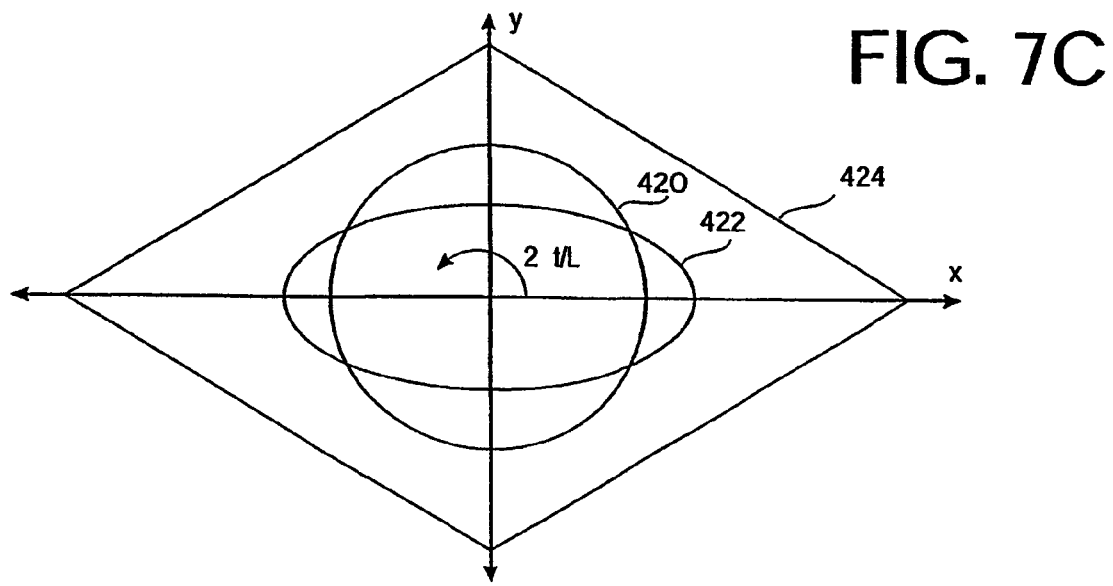

FIGS. 7A to 7C illustrate different presentations of time.

The following embodiments of the invention will be described in connection with self-organizing map (SOM) technology. FIG. 4 shows a self-organizing map. The objective with a SOM test for anomaly is to test if the current behavior of an observable object is anomalous or not. The hypothesis to be tested is:

$H_0$: The most recent observation is not anomalous.

$H_1$: The most recent observation is anomalous.

The behavior of an observable object can be very consistent, which means that it is concentrated to one or a couple of regions in the feature space. On the other hand, the behavior can also be more scattered in the feature space, which would signify a more irregular behavior. The idea of the SOM test for anomaly is to approximate the normal behavior of an observable object with a small object-specific SOM. The previous behavior is assumed to represent the normal behavior of the observable object. Anomalous observations can be omitted from the previous behavior when training the SOM.

The SOM shown in FIG. 4 is a one-dimensional (8*1) SOM with 200 points of artificial data, commonly depicted by reference number 23. FIG. 5 shows the same SOM with circles or ellipses 31 plotted using the neurons 24 of the SOM as centres. For clarity, FIGS. 4 and 5 are shown with only two features 21 and 22, but in reality, the number of observable features can be much larger than two.

200 points of artificial data for two features have been plotted in the plane together with the neurons of a map of size 8*1 trained with the data. The one-dimensional SOM approximates two clusters (having four ellipses 31 each) of data quite well. Note that the data in FIG. 4 is two-dimensional to allow visualization to humans. In a computer system, the number of dimensions can be much larger than two. The Best Mapping Unit (BMU) for a data point $f_k$ in an SOM is the neuron $w_i$ having the smallest distance to the data point. This is expressed in equation (1), where dist stands for the distance.

$$BMU = \arg\min\{dist(f_k, w_i)\} \quad (1)$$

Here, we assume that a Euclidean distance to the BMU is used to measure how much an observation deviates from the normal object-specific behavior, but other types of distance measurements can be used. The anomaly P-value is a measure of the degree of anomaly for an observation. On the basis of this value, the hypothesis $H_0$ is accepted or rejected. Calculation of the anomaly P-value will be described in connection with the use phase of the SOM-based ADS.

An ADS mechanism involves three major phases, design, teaching and use. The design phase typically involves some decisions and comprises the following steps:

1. Selecting a set of features describing the target object. The feature vector describing the object is denoted by f. (The target object is the object to be observed, such as a network element.) This step is described in detail in the above referenced article. For the purposes of the present aspect of the invention, it suffices to say that the features are parameters which can be used to make a distinction between normal and anomalous behaviour.

2. Formulating a hypothesis for detecting anomalous behaviour. The objective is to test the most recent observation $f_{n+1}$ for anomaly. The hypothesis to be tested is $H_0$: The most recent observation $f_{n+1}$ is not anomalous. The alternative hypothesis is $H_1$: The most recent observation $f_{n+1}$ is anomalous. (The suffix n will be described in connection with the use phase.)

The teaching (learning) phase typically comprises the following steps:

1. Observing normal behavior of the target object. For example, n measurements $(f_1, f_2, \ldots, f_n)$ of the feature vector are collected.

2. Training an SOM with m neurons using the measurements $(f_1, f_2, \ldots, f_n)$ as training data. The number of neurons in the map, m, is selected to be much smaller than n, for example n/10.

The use phase typically comprises the following steps:

1. Omitting neurons in the SOM that are not Best Mapping Units (BMU) for any of the data points $(f_1, f_2, \ldots, f_n)$.

2. Calculating the BMU distances for $(f_1, f_2, \ldots, f_n)$ from the trained SOM. These distances are denoted by $(D_1, D_2, \ldots, D_n)$.

3. Calculating the BMU distance for the observation $f_{n+1}$. This distance is denoted by $D_{n+1}$.

4. Calculating the anomaly P-value. Let B be the number of the Best Mapping Unit distances $(D_1, D_2, \ldots, D_n)$ higher than $D_{n+1}$. The anomaly P-value for a certain object is then calculated from:

$$P_{n+1} = \frac{B}{n} \quad (2)$$

5. Accepting or rejecting the null hypothesis on the basis of the anomaly P-value. If the anomaly P-value is higher than the anomaly P-value threshold, the null hypothesis $H_0$ is accepted (the most recent observation is considered normal). If, on the other hand, the anomaly P-value is smaller than the anomaly P-value threshold, the null hypothesis $H_0$ is rejected and the most recent data point is assumed anomalous.

If the test indicates that the object behaviour is anomalous ($H_0$ is rejected), the k most significantly deviating features can be determined. The k features (components of the feature vector) with the biggest absolute contribution to the BMU distance are the k most significantly deviating features. Equation (3) shows how the most deviating feature can be calculated. This component of the feature vector is given the subindex md in equation (3). In equation (3) BMU stands for the Best Mapping Unit of the feature vector $f_{n+1}$, and j takes values from zero to the number of features. The other k−1 most deviating features are calculated in a corresponding manner.

$$f_{n+1,md} = \arg\max_j\{abs(f_{n+1,j} - BMU_j)\} \quad (3)$$

The situation shown in FIG. 4 can be used as an example. FIG. 4 shows two anomalies, commonly depicted with reference numeral 25. The anomaly P-value for anomaly 1 is 0/200=0. Since none of the BMU distances for the data points have a BMU distance greater than that of anomaly 1, the value of the numerator is zero. Correspondingly, the anomaly P-value for anomaly 2 is 7/200=0.035.

If the Anomaly P-value is smaller than the Anomaly P-value threshold, the null hypothesis $H_0$ is rejected and an alarm is triggered. The Anomaly P-value threshold can be interpreted as the fraction of observations that will be rejected if the behavior of the observable object does not deviate from the same observable object's earlier behavior which was used during the teaching phase. That is, if the null hypothesis is true:

$$\text{number of alarms} = \text{P-value threshold} * \text{observations} \quad (4)$$

On the other hand, if the null hypothesis is not true (the new data is anomalous), the number of rejections (alarms) is higher.

FIG. 5 shows how a selected P-value threshold can be illustrated for observable object i using d-dimensional spheres (d-spheres) centred at the neurons of the object-specific map. With two-dimensional input data, the d-spheres are circles. Here d stands for the number of dimensions in the input data $(f_1, f_2, \ldots, f_n)$. In other words, each input data element $f_1$ through $f_n$ is itself a vector with d dimensions. The number of observations for object i falling outside the spheres corresponds to the numerator B in equation (2). The two-dimensional example in FIG. 5 shows such a situation. Here B is 13, which corresponds to quite high a P-value threshold of about 6.50.

FIG. 6 is a process chart illustrating a second embodiment of the invention. Reference number 302 points to an element of a physical system such as a telecommunication network (as distinguished from a neural network). A physical element may comprise several observable objects. For example, if the physical system element 302 is a telecommunication exchange, its observable objects may comprise throughput, waiting time, number (or percentage) of failed calls and the like. For each unit of time, an indicator collector 306 collects an indicator tuple 304. The tuples are stored in an indicator database 310. Reference 312 points to a data set used for training the neural network (or another learning mechanism) 314. The data set 312 should indicate normal behavior of the physical element 302. A storage 318 contains trained neural networks. When a physical element 302 is to be observed, the corresponding trained neural network 320 is retrieved from the storage 318 and applied as one input to the anomaly detection mechanism 322. The anomaly detection mechanism's other input is the indicator set 324 to be tested for anomalous behavior. If the anomaly detection mechanism 322 decides that the behavior described by the indicator set 324 is anomalous, the anomaly P-value and the most deviating indicators 326 are stored in an anomaly history database 328. At the same time, an alarm 330 is given to a monitoring device 332, such as a computer screen.

FIGS. 7A to 7C illustrate different presentations of time, some of which are acceptable and some unacceptable. In FIG. 7A, the horizontal axis is the time in units of L where L is the period of input data, which is assumed to be 24 hours. Line 400 shows a straight presentation of time. References 401 to 403 point to three instances of a repeating event which occurs at 24-hour intervals. A problem with this presentation of time is that the presentations of the times are different, and the ADS cannot recognize events 401 to 403 as a recurring event.

The saw-tooth line 405 is a 24-hour presentation of time, or in other words, a modulo function of time. In this presentation, events occurring at the same time each day have identical representations, but the day changes introduce discontinuities into the input data.

In FIG. 7B, the sine wave 410 is periodic and continuous, but it is not ambiguous. Events 411 and 412 occur at different times but have identical presentations of time. Assuming that event 411 was normal in the morning, the ADS would not recognize a similar event as an anomaly if it occurred in the evening.

FIG. 7C shows three acceptable presentations of time. They are all based on the idea that time is represented as a coordinate pair x, y. The circle 420 represents time as $\{x=\sin(2\pi t/L); y=\cos(2\pi t/L)\}$ where L is the length of the variation period, and $2\pi t/L$ is an angle from the x axis. The ellipse 422 is also acceptable as long as it is not too flat to introduce an ambiguity as to whether a point is on the top half or the bottom half of the ellipse. Even a rectangle 424 can be used. Although several points have identical x or y coordinates, no two points of the rectangle have identical x/y coordinate pairs.

The sine/cosine combination of the circle 420 is considered a preferred presentation of time because events which are equidistant in time are also equidistant in the presentation of time. However, the sine/cosine combination may be computationally intensive, and some approximations, such as a pair of triangular wave functions with a 90-degree phase shift, can be used.

As stated earlier, in some situations the presentation of time may require more than one component. For example, there may be up to three sine/cosine pairs with periods of 24 hours, one week and one year.

Although preferred embodiments of the invention have been described in connection with neural networks and self-organizing maps, the invention is not limited to these examples. As an alternative, the invention can be generalized to other clustering techniques such as k-means and Learning Vector Quantization, in which case the neurons are replaced by codebook vectors.

This embodiment provides a method for teaching an anomaly detecting mechanism in a system comprising observable objects (302), at least one of which has a periodic time-dependent behavior, the anomaly detecting mechanism comprising a computerized learning mechanism (314) having an input space for defining input data consisting of input data components (11, 12);

the method comprising:
assembling indicators (304) indicating the behavior of the observable objects (302) and arranging the assembled indicators such that each observable object's indicators are assigned to the same input data component;
teaching the learning mechanism (314) such that the input data of the learning mechanism comprises the input data components which are based on the assembled indicators (304); placing points (14) which approximate the input data in the input space;
incorporating a presentation of time (420-424) into at least one input data component (11, 12);

wherein the presentation of time (420-424) is periodic, continuous and unambiguous within the period (L) of the at least one element with periodic time-dependent behavior.

In this method, the learning mechanism may be or comprise a self-organizing map.

The presentation of time may have a first period and at least one second period which is a multiple of the first period.

The input data components may be scaled such that each has the same variance, preferably one.

The presentation of time preferably has a variable resolution such that one bit corresponds to different units of time depending on the changes in the time-dependent behavior.

This aspect of the invention furthermore provides an arrangement for detecting anomalies in a system comprising observable objects, at least one of which has a periodic time-dependent behavior;

the arrangement comprising:
a computerized learning mechanism having an input space for defining input data consisting of input data components; means for assembling indicators indicating the behavior of the observable objects and arranging the assembled indicators such that each observable object's indicators are assigned to the same input data component;
means for teaching the learning mechanism such that the input data of the learning mechanism comprises the input data components which are based on the assembled indicators; means for placing points which approximate the input data in the input space;
at least one input data component comprising a presentation of time;

wherein the presentation of time is periodic, continuous and unambiguous within the period of the at least one element with periodic time-dependent behavior.

This aspect of the invention furthermore provides an arrangement for detecting anomalies in a system comprising observable objects, at least one of which has a periodic time-dependent behavior;

the arrangement comprising:
a computerized learning mechanism having an input space for defining input data consisting of input data components;
means for assembling indicators indicating the behavior of the observable objects and arranging the assembled indicators such that each observable object's indicators are assigned to the same input data component;
means for teaching the learning mechanism such that the input data of the learning mechanism comprises the input data components which are based on the assembled indicators;
means for placing points which approximate the input data in the input space;
at least one input data component comprising a presentation of time;

wherein the presentation of time is periodic, continuous and unambiguous within the period of the at least one element with periodic time-dependent behavior.

The arrangement may be comprised in a single network element.

According to one aspect of the invention, a computer readable storage medium is provided which comprises software for a computer, wherein executing the software in the computer causes the computer to carry out all or part of the above mentioned method steps.

The above described method and apparatus are adapted for teaching an anomaly detecting mechanism in a system comprising observable objects, at least one of which has a periodic time-dependent behavior. The anomaly detecting mechanism comprises a computerized learning mechanism. The method comprises assembling indicators indicating the behavior of the elements and arranging the assembled indicators such that each observable object's indicators are assigned to the same input data component. The learning mechanism is taught so that the input data of the learning mechanism comprises the input data components which are based on the assembled indicators. Points which approximate the input data are placed in the input space. A presentation of time is incorporated into at least one input data component wherein the presentation of time is periodic, continuous and unambiguous within the period of the at least one element with periodic time-dependent behavior.

The invention can also be used in other industry areas than telecommunications and networks.

Although the invention has been described above with reference to specific embodiments, the scope of the invention also covers any alterations, additions, modifications, and omissions of the disclosed features.

The invention claimed is:

1. A method, comprising:
repeatedly detecting at least one parameter of at least one observable object of a network;
checking the at least one parameter with regard to fulfilling predetermined criteria; and
forming a vector based on the at least one parameter depending on whether the at least one parameter fulfills the predetermined criteria,
wherein the vector comprises several values which describe properties or functioning of the observable object, and the formed vector is evaluated to monitor a behavior of the observable object, and
wherein a number of parameters that fulfill the predetermined criteria during an observation period, is counted, to form key performance indicator (KPI) values which form part of the vector, each parameter having its own criteria.

2. The method according to claim 1, further comprising:
inputting the formed vector into a learning process and an analyzing process,
wherein the learning process is configured to form a reference, based on the input vector and a previous value of the reference or at least one previously input vector, to describe the behavior of the observable object, and
wherein the analyzing process is configured to compare the input vector and the reference to detect anomalous behavior.

3. The method according to claim 2, wherein the reference formed by the learning process is a profile generated from at least two vectors.

4. The method according to claim 2, wherein the learning process comprises a self organizing map (SOM).

5. The method according to claim 2, wherein the learning process comprises a K-means algorithm.

6. The method according to claim 2, further comprising:
using the vector as input data to an algorithm which learns the normal functioning of the network, and forms the reference as a profile describing the normal functioning of the network, the profile consisting of nodes or cluster centroids,
finding best mapping nodes or cluster centroids of the profile for a new incoming vector;
counting distance between the new incoming vector and the best mapping nodes or cluster centroids;
counting a distribution of distances;
checking from the distribution whether a distance of the new incoming vector represents a probability which is less than a predetermined probability set-up value; and
generating an alarm, if the check result is positive.

7. The method according to claim 1, wherein, when a real time traffic (RTT) report value fulfills the predetermined criteria, value of one key performance indicator (KPI) is increased by one.

8. The method according to claim 7, wherein a real time traffic (RTT) report containing values of the number of parameters comprises fields defining
end cause code,
a length of call, sender identification,
receiver identification,
location information,
used network resources, and/or
used services.

9. The method according to claim 1, wherein key performance indicator (KPI) value is a function of at least one predetermined real time traffic (RTT) report field values of such RTT reports that fulfill the predetermined criteria.

10. The method according to claim 1, wherein key performance indicator (KPI) value is a function of at least one other KPI.

11. The method according to claim 1, wherein the predetermined criteria are checked by comparing fields of a real time traffic (RTT) report to predetermined field thresholds.

12. The method according to claim 1, wherein the predetermined criteria and the observation period are user definable.

13. The method according to claim 1, wherein the vector is formed based on detected values in real time traffic (RTT) reports.

14. A system, comprising:
a detector configured to detect at least one parameter of at least one observable object of a network;
a checking circuit configured to check the at least one parameter with regard to fulfilling predetermined criteria;
a forming circuit configured to form a vector based on the at least one parameter depending on whether the at least one parameter fulfills the predetermined criteria, wherein the vector comprises several values which describe properties or functioning of the observable object; and
an evaluating circuit configured to evaluate the formed vector to monitor a behavior of the observable object,
wherein a number of parameters that fulfill the predetermined criteria during an observation period, is counted, to form key performance indicator (KIN) values which form part of the vector, each parameter having its own criteria.

15. An apparatus, comprising:
a detector configured to repeatedly detecting at least one parameter of at least one observable object of a network;
a checking circuit configured to check the at least one parameter with regard to fulfilling predetermined criteria; and
a forming circuit configured to form a vector based on the at least one parameter depending on whether the at least one parameter fulfills the predetermined criteria, wherein the vector comprises several values which describe properties or functioning of the observable object; and
an evaluating circuit configured to evaluate the formed vector to monitor a behavior of the observable object,
wherein a number of parameters that fulfill the predetermined criteria during an observation period, is counted, to form key performance indicator (KPI) values which form part of the vector, each parameter having its own criteria.

16. The apparatus according to claim 15, further comprising:
a learning circuit configured to receive an actually calculated vector and to form a reference, based on at least two vectors, to describe the behavior of the observable object; and
an analyzing circuit configured to analyze the actually calculated vector and to compare the received vector and the reference to detect anomalous behavior.

17. The apparatus according to claim 16, wherein the learning circuit includes a self organizing map (SOM) or K-means algorithm.

18. The apparatus according to claim 15, wherein the parameter is formed based on detected real time traffic (RTT) report field values.

19. The apparatus according to claim 15, further comprising:
an inputting circuit configured to input the vector as input data to an algorithm which learns the normal functioning of the network, and forms, as a reference, a profile describing the normal functioning of the network, the profile consisting of nodes or cluster centroids;
a locating circuit configured to find best mapping nodes or cluster centroids of the profile for a new incoming vector;
a counting circuit configured to count distance between the new incoming vector and the best mapping nodes or cluster centroids;
a counting circuit configured to count a distribution of distances;
a checking circuit configured to check whether a distance of an incoming vector has a probability value less than a predetermined probability set-up value; and
a generating circuit configured to generate an alarm, if the check result is positive.

20. An apparatus, comprising:
detecting means for detecting at least one parameter of at least one observable object of a network;
checking means for checking the at least one parameter with regard to fulfilling predetermined criteria;
forming means for forming a vector based on the at least one parameter depending on the result of the checking means, wherein the vector comprises several values which describe properties or functioning of the observable object; and
evaluating means for evaluating the formed vector for monitoring the behavior of the observable objects,
wherein a number of parameters that fulfill the predetermined criteria daring an observation period, is counted, to form key performance indicator (KPI) values which form part of the vector, each parameter having its own criteria.

21. A computer program, embodied on a computer readable medium, configured to control a processor to implement a method, the method comprising:
repeatedly detecting at least one parameter of at least one observable object of a network;
checking the at least one parameter with regard to fulfilling predetermined criteria; and
forming a vector based on the at least one parameter depending on whether the at least one parameter fulfills the predetermined criteria,
wherein the vector comprises several values which describe properties or functioning of the observable object, and the formed vector is evaluated to monitor a behavior of the observable object, and
wherein a number of parameters that fulfill the predetermined criteria during an observation period, is counted, to form key performance indicator (KPI) values which form pall of the vector, each parameter having its own, criteria.

* * * * *